June 10, 1952     A. O. LUND ET AL     2,600,308

SPEED-REGULATING CONTROL SYSTEM

Filed July 12, 1950

WITNESSES:

INVENTORS
Alvin O. Lund and
Walter H. Esselman.
BY
ATTORNEY

Patented June 10, 1952

2,600,308

UNITED STATES PATENT OFFICE 2,600,308

SPEED-REGULATING CONTROL SYSTEM

Alvin O. Lund, East Orange, and Walter H. Esselman, Cranford, N. J., assignors to Westinghouse Electric Corporation, East Pittsburgh, Pa., a corporation of Pennsylvania Application July 12, 1950, Serial No. 173,366

9 Claims. (Cl. 318—158)

Our invention relates to speed-regulating motor control systems of the variable voltage type and aims at providing systems which combine ruggedness, high reliability and ease of adjustment with stable and very smooth speed regulation to obtain an overall performance superior to that of the known systems for exacting control and reliability requirements, for instance, as desired for elevator operations.

Figure 1:
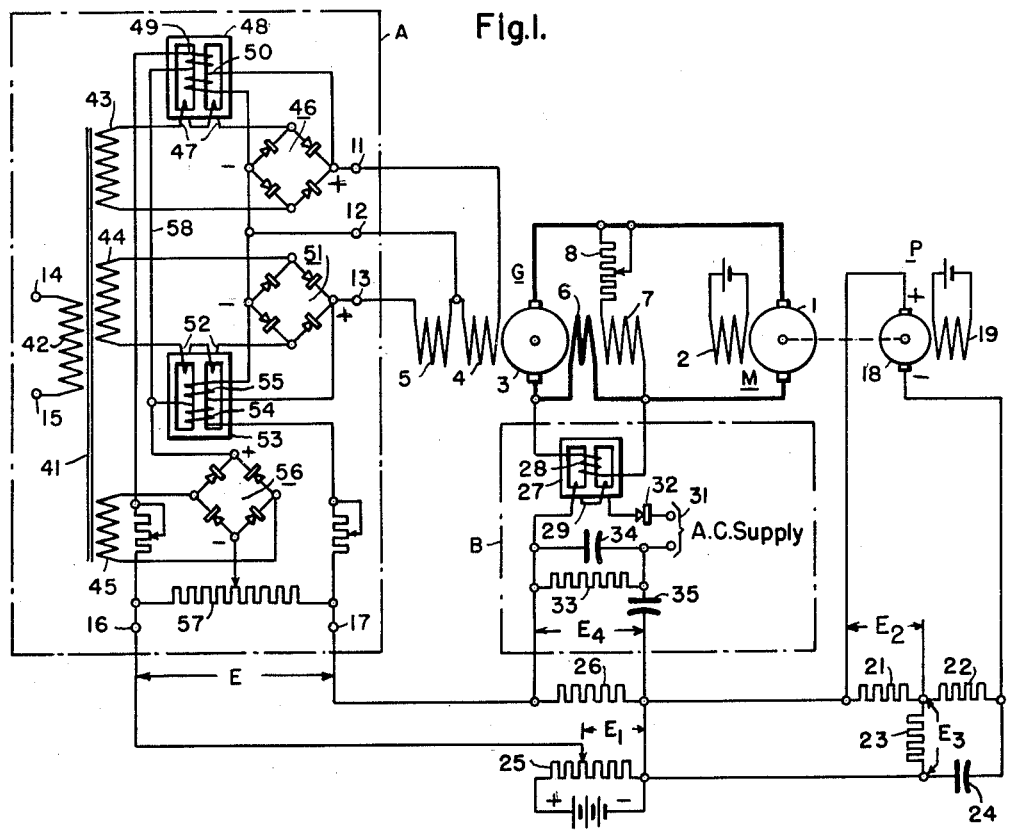
Figure 2:
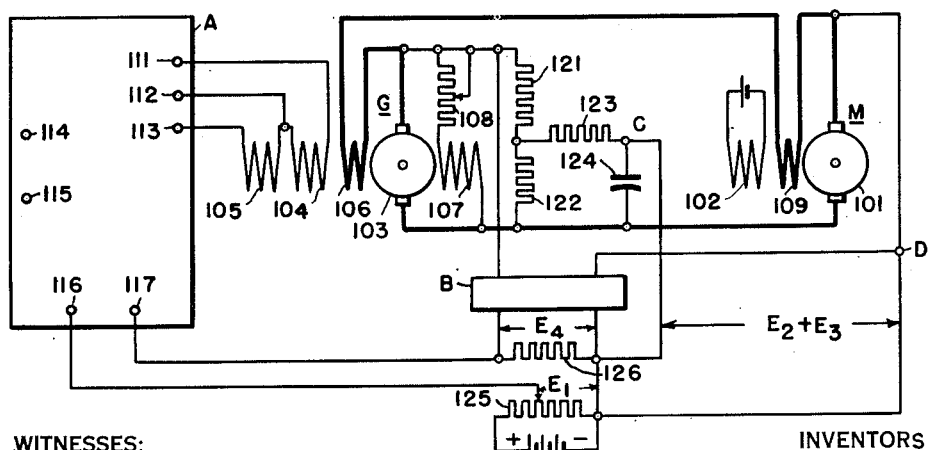

The means according to our invention, for achieving these and the more specific objects and advantages apparent from the following, are set forth with particularity in the claims annexed hereto and are exemplified by the two embodiments of speed regulated variable-voltage drives illustrated in Figs. 1 and 2, respectively, of the appertaining drawing.

In Fig. 1 the motor to be controlled is shown at M. Its armature is denoted by 1 and its field winding by 2. The field winding is energized by constant voltage from a suitable source of direct current. It will be understood that this direct current can be supplied through a rectifier from the alternating current supply means or transformer mentioned in the following. The motor armature 1 is energized from the armature 3 of a generator G with two mutually opposing control field windings 4 and 5, a series field winding or interpole winding 6 and a shunt field winding 7. A resistor 8 in the circuit of the shunt field winding 7 permits adjusting the self-excitation of the generator and may be calibrated so that this self excitation is approximately tuned to the no-load magnetization characteristic of the generator. The self-excitation of the generator, provided by windings 6 and 7, then suffices under steady state conditions to substantially maintain the generator output voltage at the desired value while the control field windings 4 and 5 are called upon to provide the additional stimulus needed to shift the voltage up or down along the voltage characteristic of the generator as long as the generator operates substantially within the unsaturated and approximately linear portion of its magnetic characteristic.

The control field windings 4 and 5 are energized from the output terminals 11, 12, 13 of a discriminating magnetic amplifier A which is energized at its power terminals 14 and 15 from an alternating-current line and receives a control signal at its input terminals 16 and 17. As will be explained, the voltage E of the input signal across terminals 16 and 17 determines by its polarity and magnitude the direction and intensity of the amplified resultant excitation applied to the generator by field windings 4 and 5.

The signal voltage E is the resultant of four component direct-current voltages $E_1$, $E_2$, $E_3$ and $E_4$, of which the voltage $E_1$ has a selectively adjusted constant value, while the voltages $E_2$, $E_3$, $E_4$ are variable in accordance with functions of the motor speed. The voltage $E_2$ is substantially proportional to the motor speed, the voltage $E_3$ is substantially proportional to the motor acceleration, and the voltage $E_4$ is a corrective damping voltage substantially proportional to the rate of change of the acceleration. The means for applying these component voltages to the input terminals of the discriminating amplifier A will be described presently.

Connected to the armature 1 of motor M is the armature 18 of a tachometer generator P which is shown to be equipped with a constant-excitation field winding 19, although it will be understood that other tachometer devices such as a permanent-magnet generator may be employed instead. Connected across the tachometer armature 18 are two series connected resistors 21 and 22. The voltage $E_2$ across resistor 21 is proportional to the motor speed. A third resistor 23 has one end attached to a circuit point between resistors 21 and 22, and is series connected with a capacitor 24 across the resistor 22. During steady state operation the capacitor 24 has no effect on the voltage appearing across the series arrangement of resistors 21 and 23. During changes in motor speed, the charging and discharging effect of capacitor 24 imposes on resistor 23 a voltage in proportion to the rate of change of the tachometer voltage. Consequently the voltage $E_3$ across resistor 23 is equal to $$k\frac{dE_2}{dt}$$

($k$=constant, $t$=time). Series connected with resistors 21 and 23 is an adjustable rheostat 25 energized from a suitable source of constant direct voltage. For instance, this source may be an exciter generator, or it may comprise a rectifier energized from the alternating-current supply means mentioned in the following. The constant voltage $E_1$ is tapped off from the rheostat 25 and represents a reference indicative of the desired motor speed.

A resistor 26 is series connected between the amplifier input terminal 17 and resistor 21. The above-mentioned damping voltage $E_4$ is impressed across the resistor 26 by a magnetic amplifying device B. This device has a saturable reactor device 27 whose D.-C. control coil 28 is connected across the series field winding 6 of the generator G, or across any other resistive circuit element of the generator-motor armature circuit, so that the control excitation of coil 28 is proportional to the current supplied to the motor armature. The reactance winding 29 of reactor 27 is connected to alternating current supply terminals 31 in series with a rectifier 32 and in series with a load resistor 33. The above-mentioned resistor 26 is connected across resistor 33 in series with a capacitor 35. A filtering capacitor 34 of low capacitance may be used for smoothening the voltage $E_4$. The voltage $E_4$ is a derivative of the current which is composed of a load component and an acceleration component. Voltage $E_4$ can be expressed as a function of the second derivative of the motor speed:

$$E_4 = f\frac{d^2E_2}{dt^2}$$

The polarities of $E_3$ and $E_4$ depend on whether the speed is increasing or decreasing or whether the current is increasing or decreasing. In order to have a damping function, $E_3$ must be positive (adds to $E_2$) when the speed is increasing or negative (subtracts from $E_2$) when the speed is decreasing. The connection shown produces the correct polarity. Likewise, when the current is increasing, the polarity of $E_4$ should be positive (adds to $E_2$) or if the current is decreasing, $E_4$ should be negative, (subtracts from $E_2$). To secure these polarities of voltage $E_4$, the positive terminal of rectifier 32 is connected to AC supply 31. In view of the just-mentioned polarities of the component control voltages relative to one another the resultant voltage E can be expressed as:

$$E = E_1 - 1(E_2 + E_3 + E_4)$$

During steady state conditions, voltages $E_3$ and $E_4$ are zero so that then the voltage E is the difference between voltages $E_1$ and $E_2$. Under the latter conditions, the adjusted voltage $E_1$ is substantially balanced by the voltage $E_2$ so that the resultant signal voltage E is approximately zero and the excitation applied to the generator control field windings at a minimum just sufficient to maintain the generator output voltage at the correct value.

The amplifier A is energized through a transformer 41 whose primary 42 is connected across the power supply terminals 14 and 15. The transformer has three secondary windings 43, 44 and 45. The secondary 43 is connected across the input terminals of a rectifier 46 in series with the reactance winding 47 of a saturable reactor 48, having two direct current control coils 49 and 50. The secondary 44 is connected across the input terminals of a rectifier 51 in series with the reactance winding 52 of a saturable reactor 53, having control coils 54 and 55. The control coils 50 and 55 are connected across the direct current output terminals of the respective rectifiers 46 and 51. These coils serve to provide the saturable reactors with feedback excitation in order to increase the amplifying gain. It should be understood that such feedback windings are not always needed, and that they may be replaced by the known self-saturating reactor circuits using auxiliary valves for causing the alternating current circuit to also provide the reactor with unidirectional premagnetization. The control coils 49 and 54 are excited from the above-mentioned input terminals 16 and 17 of the magnetic amplifier and, if needed, are also subjected to a biasing voltage supplied from the output terminals of a rectifier 56 which is energized from the transformer secondary 45. A potentiometric rheostat 57 is connected across the amplifier input terminals 16, 17, and the output circuit of rectifier 56 extends through the midtap of this rheostat.

The operation of the amplifier A will be readily understood if one first assumes that the system is energized and that the motor is in steady operation at exactly the speed determined by the selected setting of the speed control rheostat 25. Under these conditions the signal voltage E across the amplifier terminals 16 and 17 is nearly zero, and hence contributes virtually nothing to the excitation of the reactor control coils 49 and 54. Then, however, a constant flow of current passes from the output terminals of rectifiers 56 through the left-hand portion of rheostat 57 and the control coil 49 of reactor 48, and another flow of current passes from rectifier 56 through the right-hand portion of rheostat 57 and the control coil 54 of reactor 53. Consequently the premagnetization of each reactor 48 and 53 has a properly rated medium value so that the respective reactance windings 47 and 52 have corresponding medium values of reactance. The two rectifiers 46 and 51 now impress respective direct current voltages of mutually opposing polarities across the generator windings 4 and 5. These two voltages are substantially equal, and the field windings 4 and 5 are dimensioned so that the resultant field is nearly balanced.

Assume now that the motor M starts running faster than desired, for instance, due to a change in load. Then the speed responsive voltage of the pilot generator P also increases. The component voltage $E_2$ which opposes the fixed reference voltage $E_1$ also increases. As a result the differential resultant voltage E across the amplifier input terminals 16 and 17 assumes an appreciable finite value and impresses a negative potential on terminal 16 and a positive potential on terminal 17. As a result a current flows from terminal 17 through rheostat 57 to terminal 16 and imposes a corresponding voltage drop on the rheostat. This voltage drop is cumulative in the right-hand portion of rheostat 57 to the voltage impressed from rectifier 56 on the control coil 54 of reactor 53. Consequently the premagnetization of reactor 53 is increased. The reactance value of winding 52 drops accordingly, and the voltage rectified by rectifier 51 and impressed on the field winding 5 increases. The voltage drop due to the signal voltage E in the left-hand portion of rheostat 57 however is subtractive relative to the voltage impressed on this rheostat portion by the current flowing from rectifier 56 through the control coil 49 of rheostat 48, so that the reactor decreases its premagnetization and increases the reactance of its winding 47, thus causing the rectifier 46 to decrease the voltage impressed on the control field winding 4 of generator G. The resultant excitation caused by field windings 4 and 5 is no longer balanced but has an appreciable finite value whose polarity is determined by that of the field winding 5. The generator G is thus controlled to decrease the voltage applied to the motor armature thereby reducing the speed to the correct value.

Conversely if the motor M runs slower than directed by the adjustment of the speed control rheostat 25, the resultant differential voltage E becomes positive at terminal 16 and negative at terminal 17 with the effect of increasing the effective reactance of reactor 48 and decreasing the reactance of reactor 53, thus causing rectifier 46 to increase the excitation of generator field winding 4 while rectifier 51 provides reduced excitation to field winding 5. The resultant control field of generator G now has a finite value of a polarity determined by that of the field from winding 4, thus causing the generator G to increase its output voltage to the extent needed by restoring the proper motor speed.

During the just-mentioned regulating operations, the damping circuit 22, 23, 24 prevents hunting and overshoot while the voltage $E_4$ supplied by the device B improves the stability of the regulating performance.

It has been mentioned that the speed responsive voltage can be provided by means other than those illustrated in Fig. 1. An example of such a different possibility is exemplified in Fig. 2 by a system operating without a tachometer generator. Otherwise the system shown in Fig. 2 is similar to that of Fig. 1. For that reason the discriminating push-pull amplifier A and the amplifying device B are only schematically indicated, and the reference numerals used in Fig. 2 are the same as those of corresponding elements in Fig. 1, except that the prefix 1 (or 10) is added to the numerals of Fig. 2. If this is kept in mind, the foregoing description of Fig. 1 is substantially applicable to Fig. 2, with the exception of the modifications described presently.

According to Fig. 2 the resistance network for providing the substantially speed-proportional voltage $E_2$ is connected across the generator-motor loop circuit so that the voltage drop across the series arrangement of resistors 121 and 122 is substantially proportional to the terminal voltage of the motor armature 101. The series field winding 106 of the generator consisting, for instance, of an interpole or compensating winding is series connected between the resistor 121 and the motor armature. The motor is shown to be also equipped with a series field winding 109 which may also consist of a customary compensating winding, and this winding is also series connected between the motor armature and the resistor 121. The connection of resistor 123 with resistor 126, amplifier terminals 117, 116 and rheostat 125 is such that the series field windings 109 and 106 lie in a series circuit with the resistors 121 and 123. The armature current of the motor impresses across the series field windings 109 and 106 a voltage drop which is effective in the amplifier input circuit in addition to the voltage drop across the resistor 121. These two voltage drops make up the component voltage $E_2$ so that the latter depends upon the motor terminal voltage as well as upon the IR drop in the motor armature circuit. In this manner the voltage $E_2$ can be made approximately proportional to the motor speed. A modifying voltage $E_3$ is impressed across the resistor 123 by charging or discharging current from capacitor 124 during periods of changes in speed. Consequently in this embodiment the voltage appearing across the circuit points marked C and D substantially corresponds to the sum of voltage $E_2+E_3$. It will be understood that an additional series resistor in the generator motor loop circuit can be connected in the amplifier input circuit instead of the above-mentioned series field windings 106 and 109.

It will be understood by those skilled in the art that various modifications other than those specifically mentioned can be made without departing from the essential features of the invention and within the scope of the claims annexed hereto.

We claim as our invention:

1. A speed regulating control system, comprising a motor, current supply means of variable voltage connected with said motor for controlling said motor to operate at variable speed dependent upon said voltage, voltage varying means for said current supply means, static magnetic amplifier means having an output circuit connected with said voltage varying means to control the voltage of said current supply means and having an input circuit, voltage supply means of adjustable constant voltage connected to said input circuit to provide a first component control voltage, a speed-responsive voltage source connected with said motor to provide a second component control voltage in accordance with the motor speed, a capacitive circuit coupled with said source to provide a third component control voltage substantially proportional to the rate of change of said second component control voltage, an acceleration-responsive voltage source connected with said motor, another capacitive circuit connected with said latter source to provide a fourth component control voltage substantially proportional to the second derivative of the motor speed, said speed-responsive voltage source and said two capacitive circuits being connected with said input circuit to impress thereon said second, third and fourth component control voltages.

2. In combination, a variable-voltage drive system having a motor and having current supply means of controllable voltage connected with said motor for controlling said motor to operate at variable speed, voltage varying means for said current supply means, magnetostatic amplifier means having an output circuit connected with said voltage varying means to control the voltage of said current supply means for controlling its voltage and having an input circuit, adjustable voltage supply means of constant voltage connected to said input circuit to impress thereon a selective control voltage, speed-responsive first circuit means having a resistor series-connected in said input circuit and having across said resistor a voltage drop substantially proportional to the speed of said motor, acceleration-responsive second circuit means having another resistor series-connected in said input circuit and having across said other resistor a voltage drop substantially proportional to the first derivative of said speed, and third circuit means having a third resistor series-connected in said input circuit and having across said latter resistor a voltage drop substantially proportional to the second derivative of said speed, said first, second and third circuit means being connected with said drive system to be controlled in dependence upon the operation of said motor.

3. In combination, a variable-voltage drive having a direct-current motor and a generator which have a common armature circuit, said generator having two mutually opposed split field windings, a magnetic push-pull amplifier having two output circuits connected with said respective field windings and having an input circuit, voltage supply means of adjustable constant voltage connected with said input circuit to impress thereon a selected constant component control voltage, speed-responsive voltage supply means connected with said drive to provide a variable component control voltage substantially proportional to the motor speed, a capacitive circuit coupled with said second voltage supply means to provide a variable component control voltage substantially proportional to the motor acceleration, current-responsive voltage supply means connected with said armature circuit and another capacitive circuit coupled with said third voltage supply means to provide a variable component voltage substantially proportional to the rate of change of said acceleration, said speed-responsive voltage supply means and said two capacitive circuits being connected with said input circuit voltage series vibration to one another to impress said respective variable component voltages on said input circuit.

4. In combination, a variable-voltage drive having a direct-current motor and a generator which have a common armature circuit, said generator having two mutually opposed split field windings, a magnetic push-pull amplifier having two output circuits connected with said respective field windings and having an input circuit, voltage supply means of adjustable constant voltage connected with said input circuit to impress thereon a selected constant component control voltage, speed-responsive voltage supply means connected with said drive and having two series-connected resistors to impress across said resistors a voltage substantially proportional to the motor speed, a capacitor and a third resistor connected in series with each other across one of said two resistors to provide across said third resistor a voltage drop substantially proportional to the motor acceleration, the other one of said two resistors and said third resistor being series connected with each other in said input circuit in opposed voltage relation to said voltage supply means.

5. A combination according to claim 4, comprising another resistor connected in said input circuit, a capacitive impedance circuit connected across said latter resistor, and electromagnetic coupling means connecting said impedance circuit with said armature circuit to impress on said latter resistor a voltage substantially proportional to the rate of change of the motor acceleration.

6. A combination according to claim 4, comprising a resistive circuit element in said armature circuit, a magnetic amplifier having a main winding and having a direct-current control circuit connected across said element to be excited in accordance with the current flow in said armature circuit, a rectifier circuit connected with said main winding to provide rectified voltage dependent upon said current, another resistor series-connected in said input circuit, and a capacitive circuit connected across said latter resistor and connected with said rectifier circuit to impress on said latter resistor a voltage substantially proportional to the motor acceleration.

7. In combination, a variable-voltage drive having a direct-current motor and a generator which have a common armature circuit, said generator having two mutually opposed split field windings, a magnetic push-pull amplifier having two output circuits connected with said respective field windings and having an input circuit, voltage supply means of adjustable constant voltage connected with said input circuit to impress thereon a selected constant component control voltage, resistance means series-connected in said armature circuit, two resistors series-connected with each other across said armature circuit, a third resistor and a capacitor connected in series with each other across one of said two resistors, said input circuit extending in series through said resistance means and the other one of said two resistors and said third resistor to be impressed by voltage depending upon speed and acceleration of said motor.

8. A combination according to claim 7, comprising another resistor series connected in said input circuit, a capacitive circuit connected across said latter resistor, and a magnet amplifier having a main winding connected across part of said capacitive circuit and having a control circuit connected across said resistance means to impress on said latter resistor a voltage varying substantially in proportion to the rate of change of said acceleration.

9. In combination, a variable voltage drive having a direct-current motor and a generator with a common armature loop circuit, said generator having self-excited field winding means connected with said circuit and having a resistance characteristic nearly coincident with the linear portion of the magnetic no-load characteristic of said generator, two mutually differential control field windings on said generator, a magnetostatic push-pull amplifier having two rectifier output circuits of inversely variable voltages connected with said respective control field windings and having a direct-current input circuit for controlling said latter voltages, speed-responsive voltage supply means connected with said drive and having two series connected resistors to provide across said resistors a voltage variable substantially in proportion to the motor speed, a third resistor and a capacitor connected in series with each other across one of said two resistors to provide across said third resistor a variable voltage substantially proportional to the motor acceleration, and a voltage-adjustable source of selective reference voltage connected with said input circuit in series relation to said third resistor and in series relation to the other one of said two resistors, said source being poled in opposition to said two variable voltages.

ALVIN O. LUND.
WALTER H. ESSELMAN.

REFERENCES CITED

The following references are of record in the file of this patent:

UNITED STATES PATENTS

| Number | Name | Date |
| --- | --- | --- |
| 2,456,938 | Harder | Dec. 21, 1948 |
| 2,504,105 | Bendz | Apr. 18, 1950 |